US008127276B2

(12) United States Patent
Chen et al.

(10) Patent No.: US 8,127,276 B2
(45) Date of Patent: Feb. 28, 2012

(54) APPARATUS, METHOD, AND COMPUTER READABLE MEDIUM THEREOF FOR GENERATING AND UTILIZING A FEATURE CODE TO MONITOR A PROGRAM

(75) Inventors: Cheng-Kai Chen, Hsi-Chi (TW); Hung Min Sun, Hsinchu (TW); Kang-Chiao Lin, Chu-Shan Town (TW); Shih-Ying Chang, Nantou (TW); Shuai-Min Chen, Hsi-Chi (TW)

(73) Assignee: Institute for Information Industry, Taipei (TW)

( * ) Notice: Subject to any disclaimer, the term of this patent is extended or adjusted under 35 U.S.C. 154(b) by 1340 days.

(21) Appl. No.: 11/695,959

(22) Filed: Apr. 3, 2007

(65) Prior Publication Data

US 2008/0148226 A1   Jun. 19, 2008

(30) Foreign Application Priority Data

Dec. 13, 2006   (TW) ................. 95146720 A

(51) Int. Cl.
 *G06F 9/44* (2006.01)
(52) U.S. Cl. ........ 717/127; 717/106; 717/124; 717/133; 712/221; 726/22; 726/23
(58) Field of Classification Search ........................ None
See application file for complete search history.

(56) References Cited

U.S. PATENT DOCUMENTS

| | | | | |
|---|---|---|---|---|
| 5,974,549 A * | 10/1999 | Golan | ........................ | 726/23 |
| 6,253,338 B1 * | 6/2001 | Smolders | ........................ | 714/45 |
| 6,687,857 B1 * | 2/2004 | Iwata et al. | ........................ | 714/38.13 |
| 6,721,941 B1 * | 4/2004 | Morshed et al. | ........................ | 717/127 |
| 6,760,903 B1 * | 7/2004 | Morshed et al. | ........................ | 717/130 |
| 6,957,422 B2 * | 10/2005 | Hunt | ........................ | 717/130 |
| 7,114,093 B2 * | 9/2006 | Tardieux et al. | ........................ | 713/600 |
| 7,225,309 B2 * | 5/2007 | DeWitt et al. | ........................ | 711/165 |
| 7,421,681 B2 * | 9/2008 | DeWitt et al. | ........................ | 717/128 |

(Continued)

FOREIGN PATENT DOCUMENTS

CN    1447244 A    10/2003

(Continued)

OTHER PUBLICATIONS

Title: Using AOP to monitor and administer software for grid computing environments, Grechanik, M.;et al, source: IEEE, dated: Jul. 26, 2005.*

*Primary Examiner* — Chameli Das
(74) *Attorney, Agent, or Firm* — Patterson Thuente Christensen Pedersen, P.A.

(57) ABSTRACT

Apparatus, method, and computer readable medium for generating and utilizing a feature code to monitor a program are provided. The program is run in a secure environment at the beginning. The program calls a function through an application program interface. A return address of the application program interface is used to generate the feature code. When the application runs again at another time, the feature code is utilized to monitor the program. According to the aforementioned arrangement and steps, the application program interface can be monitored dynamically. Consequently, any program can be monitored by this approach, which results in a more secure environment. Further, fewer application program interfaces are required to be monitored, so the required computer resource is less.

27 Claims, 5 Drawing Sheets

U.S. PATENT DOCUMENTS

| | | | |
|---|---|---|---|
| 7,526,757 B2* | 4/2009 | Levine et al. | 717/130 |
| 7,577,952 B2* | 8/2009 | Gauvin | 718/100 |
| 7,603,704 B2* | 10/2009 | Bruening et al. | 726/22 |
| 7,665,138 B2 | 2/2010 | Song et al. | |
| 2003/0046423 A1* | 3/2003 | Narad et al. | 709/238 |
| 2003/0117176 A1* | 6/2003 | Tardieux et al. | 326/93 |
| 2004/0133777 A1* | 7/2004 | Kiriansky et al. | 713/166 |
| 2005/0039172 A1* | 2/2005 | Rees et al. | 717/130 |
| 2005/0108562 A1* | 5/2005 | Khazan et al. | 713/200 |
| 2006/0150194 A1* | 7/2006 | Xing et al. | 718/108 |
| 2007/0073865 A1* | 3/2007 | Motoyama et al. | 709/224 |
| 2007/0083813 A1* | 4/2007 | Lui et al. | 715/709 |
| 2010/0011209 A1* | 1/2010 | Kiriansky et al. | 713/166 |

FOREIGN PATENT DOCUMENTS

| | | |
|---|---|---|
| TW | 487839 | 5/2002 |
| TW | 1252976 | 4/2006 |
| WO | WO 01/37067 A1 | 5/2001 |

* cited by examiner

APPARATUS, METHOD, AND COMPUTER READABLE MEDIUM THEREOF FOR GENERATING AND UTILIZING A FEATURE CODE TO MONITOR A PROGRAM

This application claims the benefit of priority based on Taiwan Patent Application No. 095146720 filed on Dec. 13, 2006, of which the contents are incorporated herein by reference in its entirety.

CROSS-REFERENCES TO RELATED APPLICATIONS

Not applicable.

BACKGROUND OF THE INVENTION

1. Field of the Invention

The present invention relates to an apparatus, a method, and a computer readable medium for monitoring a program; specifically to an apparatus, a method, and a computer readable medium for monitoring a program by the application program interface hooking (API hooking) technique.

2. Descriptions of the Related Art

Due to the popularization of the Internet, nowadays viruses that attack computers mainly come from the Internet, such as worms and Trojans. In a computer using Microsoft window system, worms and Trojans usually take the control of the execution to attack the computer when the problem of buffer overflow occurs during the execution of a program or when the system of the computer calls application program interfaces (APIs).

FIG. 1A illustrates the concept that a program 111 calls a target API 112 of the prior art. The directions of the arrows 113, 114 in the figure indicate the directions of the call and the return, respectively. From the arrows 113, 114, it is known that the program 111 calls the target API 112 directly and the target API 112 returns to the program 111 after the execution directly as well.

Currently, most anti-virus software looks for and records a feature of a worm/Trojan after a computer has been attacked for the first time. The feature of the worm/Trojan is then added to a virus code for future comparison. Current anti-virus software adopts a technique called decompile to achieve that. The execution file of a program is decompiled to get return addresses of all APIs, which will be compared with when the execution file is executed another time. The technique has two main disadvantages. First, not all execution files can be decompiled, such as plug-ins and dynamically loaded programs. Second, all APIs have to be monitored and consume huge resources.

Consequently, how to provide an efficient API monitoring technique so that even compiled programs and plug-ins can be monitored during execution is still a critical issue in this field.

SUMMARY OF THE INVENTION

An object of the present invention is to provide an apparatus for generating a feature code to monitor a program. The apparatus comprises a call module, a record module, and a generation module. The call module is configured to make the program call a function through a first application program interface (API). The record module is configured to record a first return address after the first API calls the function. The generation module is configured to generate the feature code according to the first return address. The feature code is used to be compared with a monitor code generated by the same steps when the program is executed at another time to decide whether the program is attacked.

Another object of the present invention is to provide an apparatus for monitoring a program by a feature code. The apparatus comprises a call module, a record module, a generation module, and a determination module. The call module is configured to make the program call a function through a first API. The record module is configured to record a first return address after the first API calls the function. The generation module is configured to generate a monitor code according to the first return address. The determination module is configured to determine whether the monitor code is equivalent to the feature code. The feature code is generated by the same steps another time the program is executed and the generation module further generates a message showing the program being attacked when the monitor code is not equivalent to the feature code.

Another object of the present invention is to provide a method for generating a feature code to monitor a program. The method comprises the steps of making the program call a function through a first API, recording a first return address after the first API calls the function, and generating the feature code according to the first return address. The feature code is used to be compared with a monitor code generated by the same steps when the program is executed at another time to decide whether the program is attacked.

Yet another object of the present invention is to provide a computer readable medium storing a computer program to execute the aforementioned method.

A further object of the present invention is to provide a method for monitoring a program by a feature code. The method comprises the steps of making the program call a function through a first API, recording a first return address after the first API calls the function, generating a monitor code according to the first return address, determining whether the monitor code is equivalent to the feature code, and generating a message showing the program being attacked when the monitor code is not equivalent to the feature code. The feature code is generated by the same steps another time the program is executed.

Yet a further object of the present invention is to provide a computer readable medium storing a computer program to execute the aforementioned method.

The present invention executes a program in a secure environment in advance to call a function that the program intends to call through APIs and to generate a feature code according to return addresses of the APIs. Thereafter, the feature code can be used to monitor the program during the execution. In addition, a better protection is provided because the present invention monitors the APIs dynamically. Moreover, the number of the APIs that have to be monitored is small, so the present invention does not put much load on the system using the present invention.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention has two phases: a record phase and a monitor phase. At the record phase, a program is executed in a secure environment in advance. An API hooking technique is utilized to monitor various behaviors of the program and to record the return addresses of the APIs. Then, a feature code is generated according to the return addresses. When the program is executed in another time, the monitor phase is entered. The API hooking technique is also utilized to monitor the real behaviors of the program and to record the return addresses of the APIs. A monitor code is generated according to the return addresses as well. Finally, the monitor code is compared with the feature code. If the two codes are different, the program is attacked.

Figure 1A:
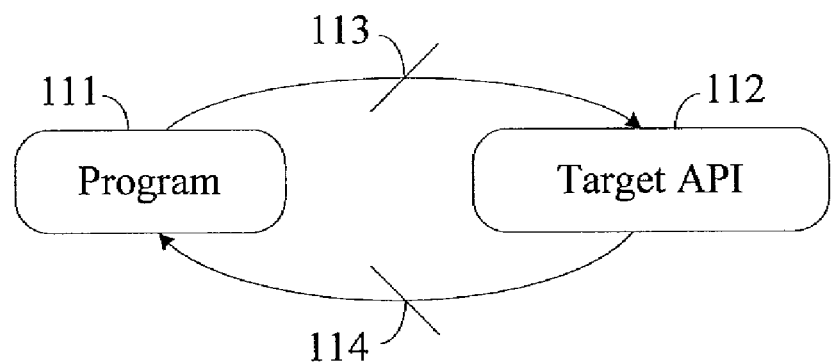
FIG. 1A illustrates the concept that a program calls a target API of the prior art.
Figure 1B:
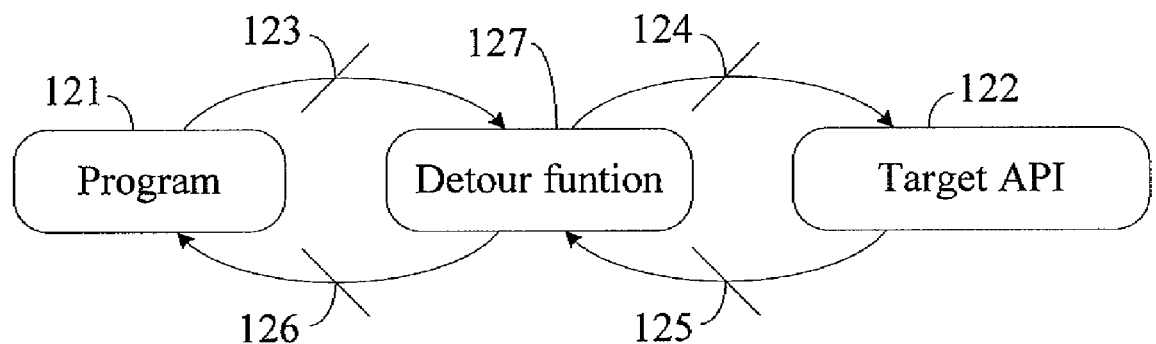
FIG. 1B illustrates the concept to realize the present invention.

FIG. 1B illustrates the concept to realize the present invention. The arrows 123, 124, 125, 126 indicate the directions of the calls and the returns between a program 121, a detour function 127, and a target API 122. The arrows also indicate the transfers of the control of the execution. When a program 121 intends to call a function (not shown), it calls the function through a target API 122. In order to do that, the present invention first calls a detour function 127 as indicated by the arrow 123 and then calls the target API 122 through the detour function 127 as shown by the arrow 124. When the execution of the target API 122 is finished, the control of the execution is returned to the program 121 through the detour function 127. That is, the control of the execution is returned from the target API 122 to the detour function 127 as indicated by the arrow 125 and then is further returned to the program 121 as indicated by the arrow 126. The present invention applies the recording and the monitoring techniques in the detour function 127 and makes the call and the return between the program 121 and the target API 122 have to pass through the detour function 127. By the arrangement, the detour function 127 is able to monitor the behaviors when the program 121 calls the target API 122 to determine whether the program 121 is under attack.

Figure 2:
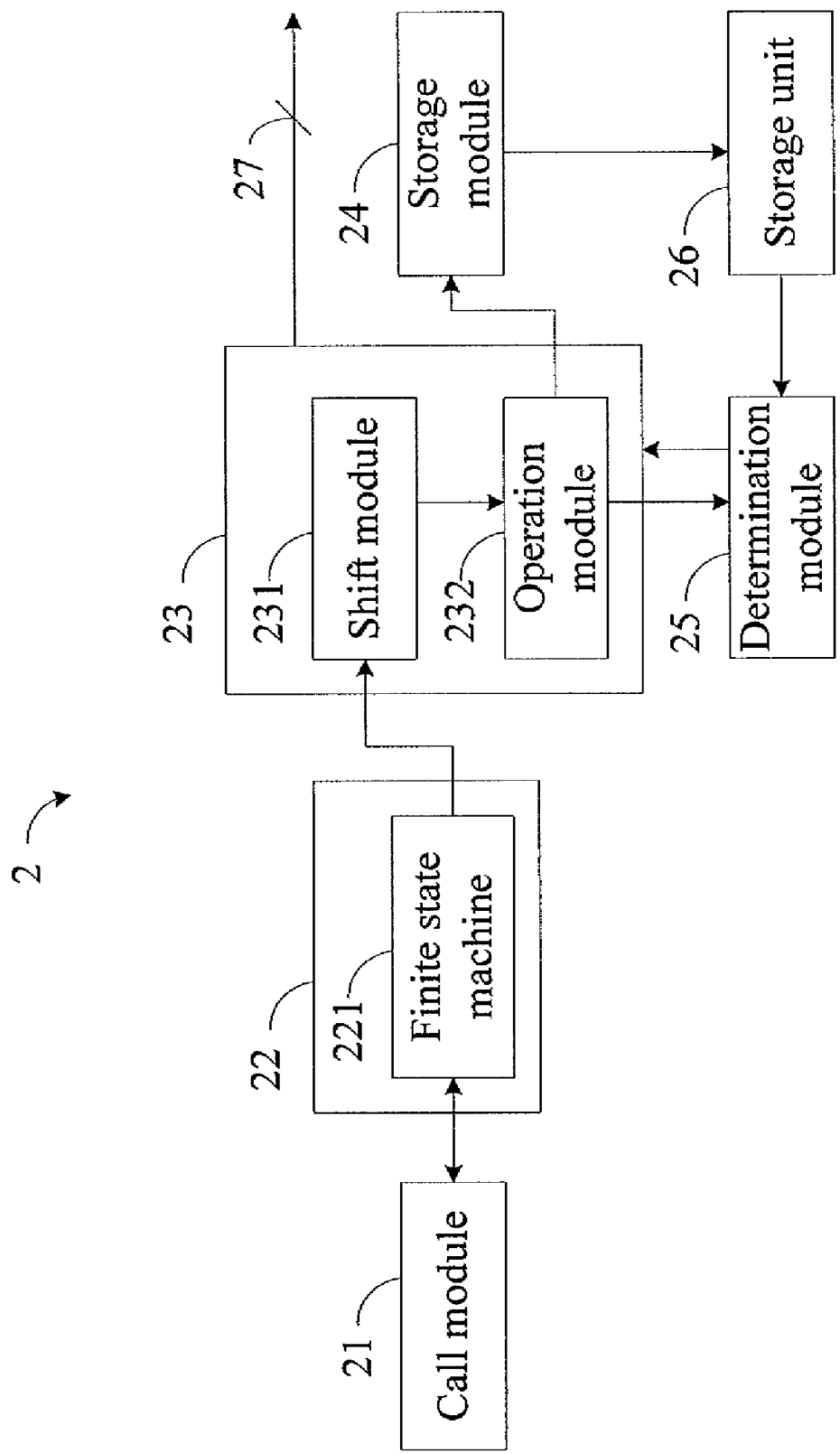
FIG. 2 illustrates a first embodiment of the present invention.

FIG. 2 illustrates a first embodiment of the present invention, which is an apparatus 2 for generating and utilizing a feature code to monitor a program. The apparatus 2 comprises a call module 21, a record module 22, a generation module 23, a storage module 24, a determination module 25, and a storage unit 26. The record module 22 comprises a finite state machine 221. The generation module 23 comprises a shift module 231 and an operation module 232. The apparatus 2 is adapted to Microsoft windows system.

The apparatus 2 operates in two phases: a record phase for generating the feature code and a monitor phase for utilizing the feature code. Both the two phases occur during the time when the program intends to call a function. Since the apparatus 2 is adapted to Microsoft windows system, when the program calls the function, it has to derive an address of a library storing the function through a first API, i.e. LoadLibraryA( ), and then derive an address of the function through a second API in advance, i.e. GetProcAddress( ). After the program gets the address of the function through the second API, it then executes the function. What to be monitored by this embodiment are the first API and the second API. In other words, both the first API and the second API are the target API 122 in FIG. 1B.

Figure 3:
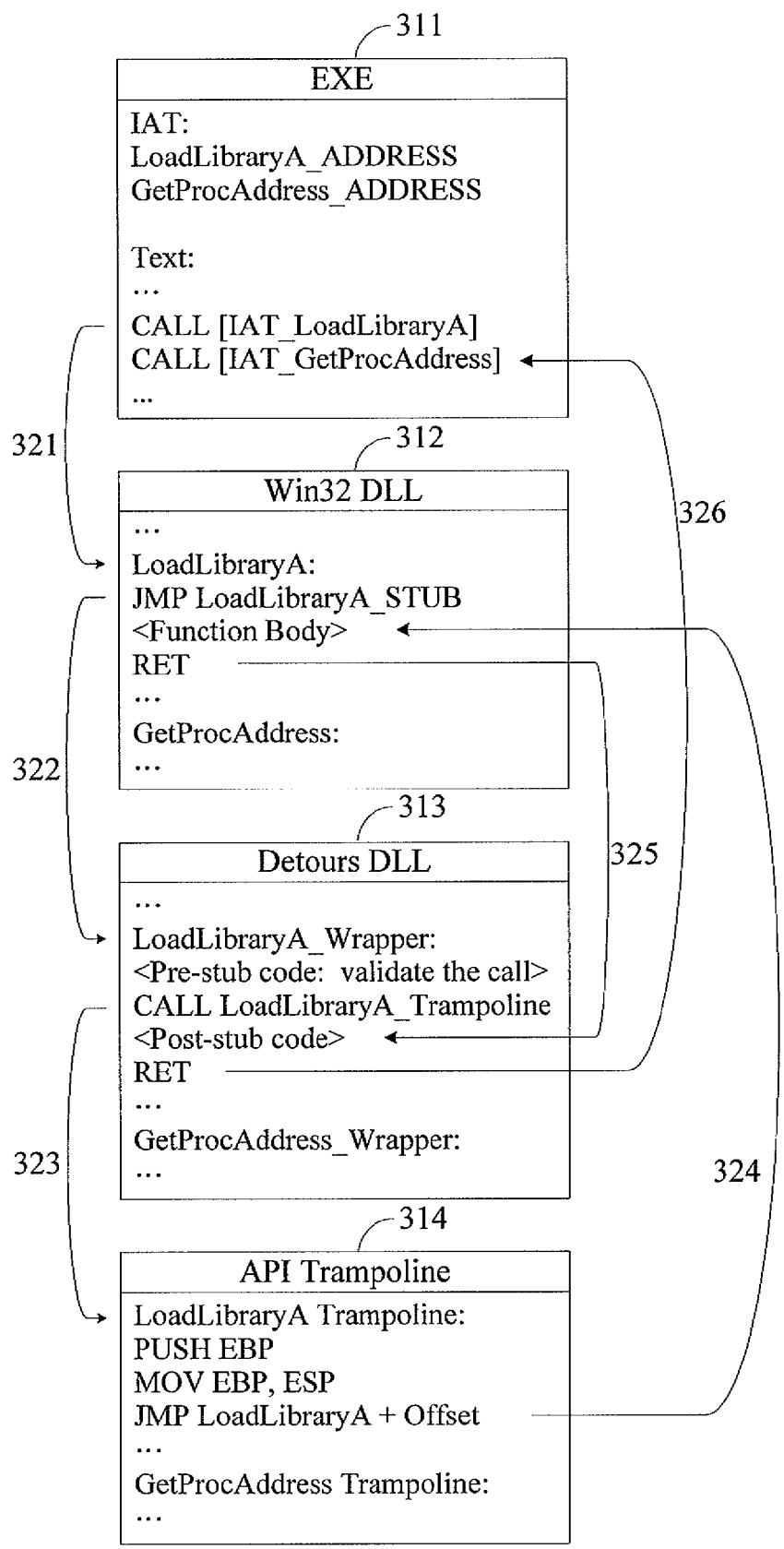
FIG. 3 illustrates the process of the execution of the program in the first embodiment.

First, the record phase of the apparatus 2 is described. Please refer to FIG. 3, which illustrates the flow of the execution of the program 311. At this moment, the program 311 is executed under a secure environment. When the program 311 intends to call the function (not shown), it utilizes the call module 21 to call the function through the first API and the second API. Since the apparatus 2 is adapted to Microsoft windows system, both the first API and the second API are stored in Win32DLL 312.

To be more specific, the call module 21 utilizes the instruction CALL [IAT_LoadLibraryA_ENTRY] in the program 311 to call the first API, i.e. LoadLibraryA( ), so that the program 311 can transfer the control of the execution to the first API (LoadLibraryA( )) in Win32DLL 312 as indicated by the arrow 321. If using the techniques of the prior art, when the control of the execution is transferred to the first API, the function body denoted as <Function Body> is executed immediately. Then, RET is executed to return the control to the program 311. In this embodiment, the call module 21 utilizes JMP LoadLibraryA_STUB of the first API to transfer the control of the execution to LoadLibraryA_Wrapper of a detour function 313 as indicated by the arrow 322.

When the control of the execution is transferred to the detour function 313, the record module 22 records a first return address of the first API after calling the function. The detail of the recording of the record module 22 will be explained later. Next, the call module 21 utilizes Call LoadLibraryA_Trampoline of the detour function 313 to transfer the control of the execution to API Trampoline 314 as shown by arrow 323. The object of this transfer of the control of the execution is to make the API Trampoline 314 to calculate the address of a next instruction of the first API in the Win32DLL 312. The call module 21 utilizes JMP LoadLibraryA+Offset of the API Trampoline 314 to return the control of the execution to the first API in the Win32DLL 312 as shown by arrow 324. Then, the function body, denoted as <Function Body> is executed continuously.

When the first API finishes the execution, the call module 21 calls the RET of the first API to return the control of the execution to the detour function 313 as indicated by the arrow 325. Then, the call module 21 calls the RET of the detour function 313 to return to the program 311 as shown by the arrow 326. Thus, the calling of the first API is finished.

According to the aforementioned flow, when the first embodiment intends to execute the function body, the call module 21 transfers the control of the execution to the detour function 313 first so that the record module 22 is able to record the first return address of the first API. After the record module 22 finishes the recording, the call module 21 continues to transfer the control of the execution so that the function body of the first API will be executed and then returns to the program 311 through the detour function 313. In other words, by using the call module 21 to transfer the control of the execution at different time of the execution, the detour function 313 can be built between the program 311 and the first API. It is noted that the program 121 in FIG. 1B means the program 311 in FIG. 3, the detour function 127 in FIG. 1B means the detour function 313 in FIG. 3, and the target API in FIG. 1B is Win32DLL 312 in FIG. 3.

After the control of the execution is returned to the program 311, the program 311 still has to derive the address of the function by the second API, i.e. GetProcAddress( ). At this moment, the call module 21 and the record module 22 performs operations similar to the aforementioned ones. That is, the call module 21 transfers the control of the execution to locations corresponding to the second API (GetProcAddress ( )) in the program 311, in the Win32DLL 312, in the detour function 313, and in the API Trampoline 314 according to the sequence similar to the arrows 321, 322, 323, 324, 325, 326 at different time during the execution. The record module 22 records the second return address of the second API when the call module 21 transfers the control of the execution to the detour function 313. When the control of the execution is finally returned to the program 311, the calling of the second API is finished.

Figure 4:
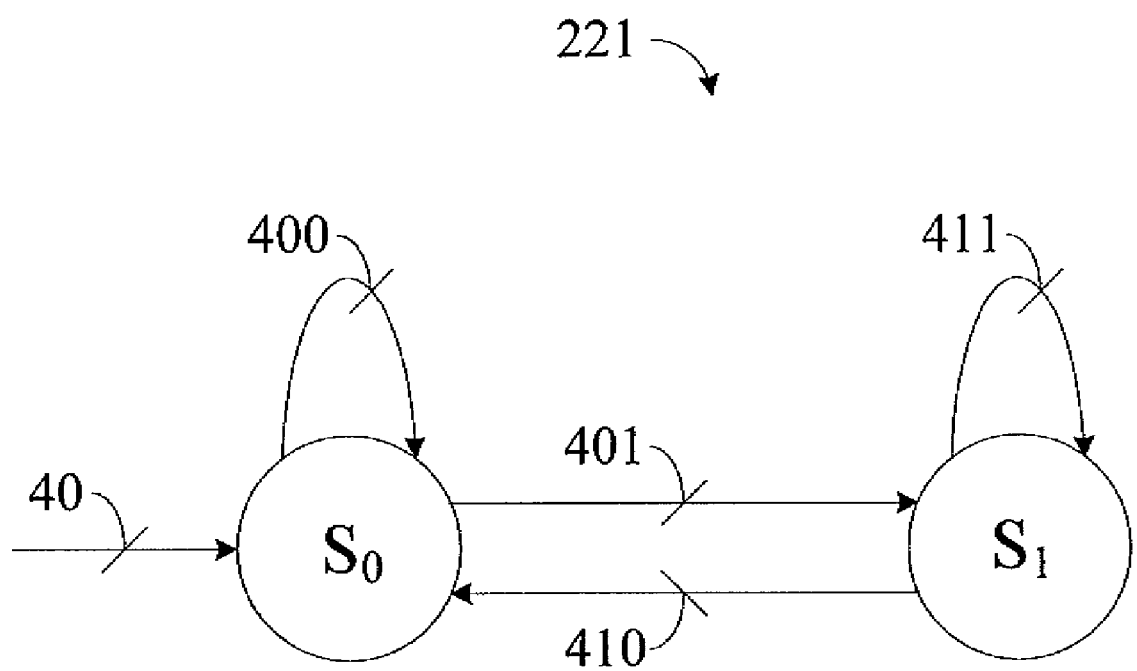
FIG. 4 illustrates the operations of the finite state machine.

The detailed operations of the record module 22 are explained here. Please refer to FIG. 4, which illustrates the operations of the finite state machine 221 comprised in the record module 22 of the first embodiment. The finite state machine 221 has two states $S_0$ and $S_1$, wherein the state $S_0$ indicates that the first return address of the first API is just derived and the state $S_1$ indicates that the second return address of the second API is just derived. When the finite state machine 221 begins to execute, it is the situation that the call module 21 calls the first API, so the state $S_0$ is entered as indicated by the arrow 40. Next, if the call module 21 calls the second API, the state $S_1$ is entered as shown by the arrow 401. After the state $S_1$ is entered, the finite state machine 221 stores the first return address of the first API and the second return address of the second API.

The program 311 may call more than one function in some occasions. Under this circumstance, the call module 21 will call the first API and the second API several times, which makes the finite state machine 221 switch between the state $S_0$ and the state $S_1$ continuously for several times. To be more specifically, when the finite state machine 221 is in the state $S_0$, it enters the state $S_0$ again as shown by the arrow 400 if the call module 21 calls the first API again. When the finite state machine 221 is in the state $S_1$, it enters the state $S_0$ as shown by the arrow 410 if the call module 21 calls the first API. When the finite state machine 221 is in the state $S_1$, it enters the state $S_1$ again as shown by the arrow 411 if the call module 21 calls the second API again.

Then, the generation module 23 generates the feature code according to the first return address and the second address. To be more specifically, the shift module 231 shifts a plurality of bits of the second return address 7 bits to the left. Then, the operation module 232 applies an XOR operation to the shifting result and the first return address to derive the feature code. It is emphasized that the number of bits to be shifted can be adjusted according to the practical situation and is not used to limit the scope of the present invention. In addition, the shift module 231 may shift the bits of the first return address instead. Finally, the storage module 24 stores the feature code in the storage unit 26.

The monitor phase of the first embodiment is described in the following. After the generation of the feature code, the program 311 may be executed in other environment. At this moment, the feature code is used to determine whether the program 311 is under attack. The monitor phase is similar to the record phase. That is, when the program 311 is executed, the call module 21, the record module 22, and the generation module 23 perform the same operations as in the record phase. However, the result of applying the XOR to the first return address and the second address by the generation module 23 is called a monitor code. Then, the determination module 25 determines whether the monitor code is the same as the one stored in the storage unit 26. If the two are different, the generation module 23 generates a message 27 indicating that the program 311 has been attacked.

It is required to mention that the apparatus 2 of the first embodiment can be used to monitor other APIs. It is not limited to monitor only the first API, LoadLibraryA( ), and the second API, GetProcAddress( ). Besides, the present invention is able to monitor only one API, which can be achieved by small modifications of the generation module 23. For example, the generation module 23 can simply use the return address of the API as the feature code or simply shift some bits of the return address to derive the feature code. Furthermore, the present invention is able to be used in other operation systems other than Microsoft windows system.

According to the aforementioned arrangement, the present invention is able to monitor APIs dynamically, so it is suitable for all execution files, such as dynamically loaded plug-ins. Consequently, the protection provided by the present invention covers more types of execution files. The load put to the system by the present invention is not much.

Figure 5:
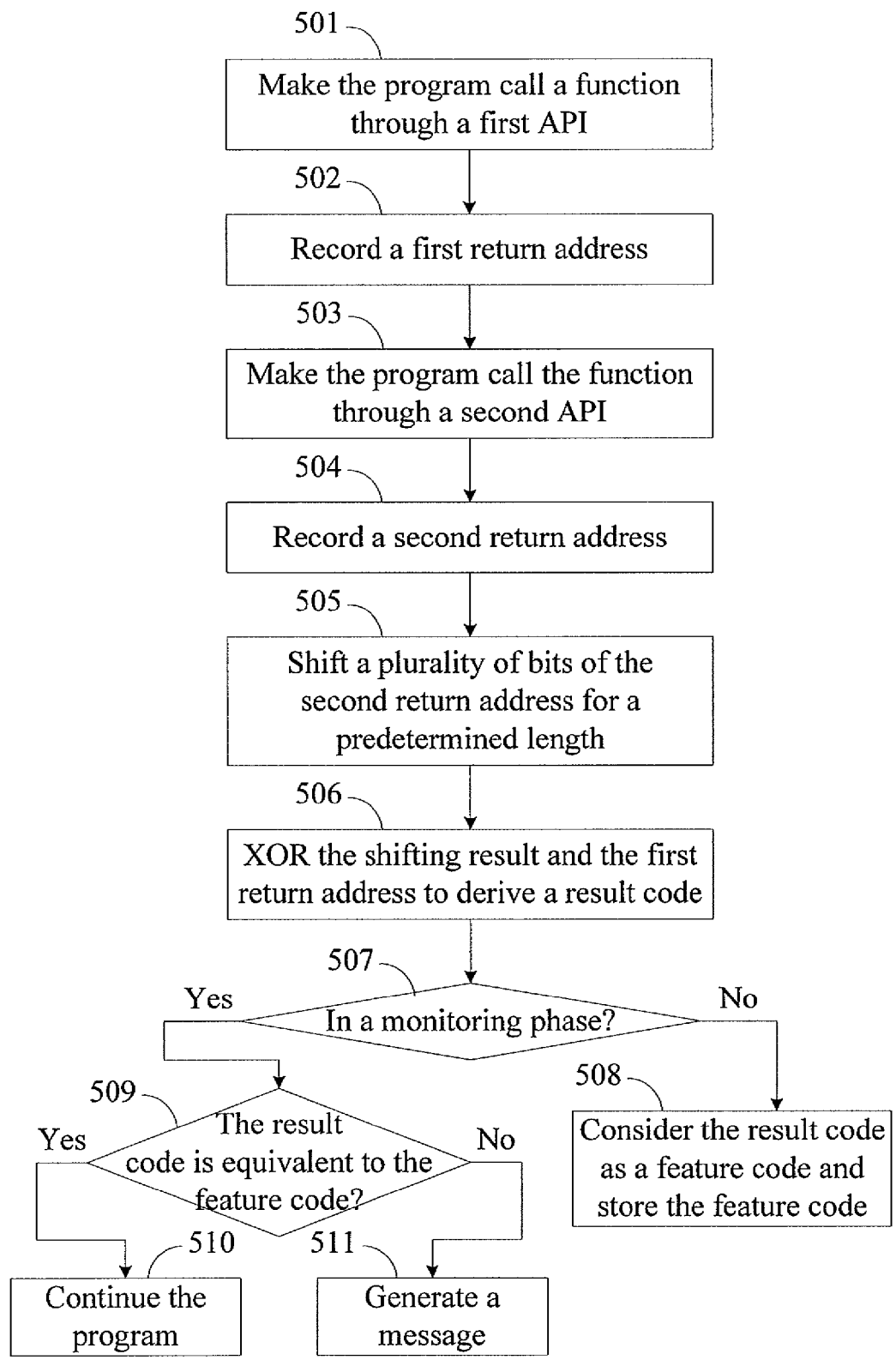
FIG. 5 illustrates a second embodiment of the present invention.

FIG. 5 illustrates a second embodiment of the present invention, which is a flowchart of a method for generating and utilizing a feature code to monitor a program. The second embodiment is adapted to the situation that the program intends to call a function.

First, the second embodiment executes step 501 to make the program call the function through a first API. Next, step 502 is executed to record a first return address after the first API calls the function. The second embodiment further executes step 503 to make the program call the function through a second API. In step 504, the second embodiment records a second return address after the second API calls the function.

Next, shift a plurality of bits of the second return address for a predetermined length in step 505. In step 506, the second embodiment applies an XOR operation to the shifting result and the first return address to derive a result code. Step 507 is then executed to determine whether the program is in a monitor phase. If it is not, the program is in a record phase and the result code derived in step 506 is considered as the feature code. Then, step 508 is executed to store the feature code. If it is yes in step 507, it is considered that the feature code has been generated, so the result code derived in step 506 is considered as a monitor code. Then, step 509 is executed to determine whether the monitor code is equivalent to the feature code. If the answer is yes, i.e. the monitor code being equivalent to the feature code, then step 510 is executed to continue the execution of the program. If it is no in step 509, i.e. the monitor code being different to the feature code, then step 511 is executed to generate a message showing that the program is under attack.

In addition to the steps shown in FIG. 5, the second embodiment is able to execute all of the operations and the functions recited in the first embodiment. Those skilled in this field should be able to straightforwardly realize how the second embodiment performs these operations and functions based on the above descriptions of the first embodiment. Thus, no unnecessary detail is given here.

A third embodiment of the present invention is another method for generating and utilizing a feature code to monitor a program, wherein the method is adapted to the apparatus 2 of the first embodiment and executes the steps in FIG. 5.

First, the third embodiment executes step 501 to enable the call module 21 to make the program call the function through a first API. Next, step 502 is executed to enable the record module 22 to record a first return address after the first API calls the function. The third embodiment further executes step 503 to enable the call module 21 to make the program call the function through a second API. In step 504, the third embodiment enable the record module 22 to record a second return address after the second API calls the function.

Next, enable the shift module 231 to shift a plurality of bits of the second return address for a predetermined length in step 505. In step 506, the third embodiment enables the operation module 232 to apply an XOR operation to the shifting result and the first return address to derive a result code. Step 507 is then executed to enable the determination module 25 to determine whether the program is in a monitor phase. If it is not, the program is in a record phase and the result code derived in step 506 is considered as the feature code. Then, step 508 is executed to enable the storage module 24 to store the feature code. If it is yes in step 507, it is considered that the feature code has been generated, so the result code derived in step 506 is considered as a monitor code. Then, step 509 is executed to enable the determination module 25 to determine whether the monitor code is equivalent to the feature code. If the answer is yes, i.e. the monitor code being equivalent to the feature code, then step 510 is executed to continue the execution of the program. If it is no in step 509, i.e. the monitor code being different to the feature code, then step 511 is executed to enable the generation module 23 to generate a message showing that the program is under attack.

In addition to the steps shown in FIG. 5, the third embodiment is able to execute all of the operations and the functions recited in the first embodiment. Those skilled in this field should be able to straightforwardly realize how the third embodiment performs these operations and functions based on the above descriptions of the first embodiment. Thus, no unnecessary detail is given here.

By the aforementioned arrangements and steps, the present invention executes a program in a secure environment first to call a function that the program intends to call through APIs and to generate a feature code according to return addresses of the APIs. Thereafter, the feature code can be used to monitor the program during the execution. In addition, a better protection is provided because the present invention monitors the APIs dynamically. Moreover, the number of the APIs that have to be monitored is small, so the present invention does not put much load on the system using the present invention.

The aforementioned methods can be realized via application programs. The application programs can be carried on computer readable medium. The computer readable medium can be a floppy disk, a hard disk drive, an optical disc, a flash disk, a tape, a database accessible from a network or any storage medium with the same functionality that can be easily thought by people skilled in the art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus, including a processor, for generating a feature code to monitor a program, comprising:
    a call device for making the program call a function through a first application program interface (API) and a second API;
    a record device being electrically connected to the call device and configured for recording a first return address after the first API calls the function and recording a second return address after the second API calls the function;
    a generation device being electrically connected to the record device and configured for generating the feature code by using the first return address and the second return address, the generation device including a shift device being electrically connected to the record device and configured for shifting a plurality of bits of the second return address for a predetermined length; and an operation device being electrically connected to the shift device and configured for applying an XOR operation to the shifting result and the first return address to derive the feature code;
    wherein the feature code is used to be compared with a monitor code when the program is executed at another time to decide whether the program is attacked.

2. The apparatus of claim 1, wherein the record device comprises:
    a finite state machine being electrically connected to the call device and the generation device and configured for recording the first return address and the second return address.

3. The apparatus of claim 1, further comprising:
    a storage device being electrically connected to the generation device and configured for storing the feature code.

4. The apparatus of claim 1, wherein the call device makes the program call the function through the first API directly and makes the program call a library storing the function through the second API.

5. The apparatus of claim 1, wherein the apparatus is adapted to a Microsoft Windows system, the first API is LoadLibraryA( ) and the second API is GetProcAddress( ).

6. An apparatus, including a processor, for monitoring a program by a feature code, comprising:
    a call device for making the program call a function through a first application program interface (API) and a second API;
    a record device being electrically connected to the call device and configured for recording a first return address after the first API calls the function and recording a second return address after the second API calls the function;
    a generation device being electrically connected to the record device and configured for generating a monitor code by using the first return address and the second return address, the generation device including a shift device being electrically connected to the record device and configured for shifting a plurality of bits of the second return address for a predetermined length and an operation device being electrically connected to the shift device and the determination device for applying an XOR operation to the shifting result and the first return address to derive the monitor code; and a determination device being electrically connected to the generation device and configured for determining whether the monitor code is equivalent to the feature code;

wherein the feature code is generated at another time the program is executed and the generation device further generates a message showing the program being attacked when the monitor code is not equivalent to the feature code.

7. The apparatus of claim 6, wherein the record device comprises:
a finite state machine being electrically connected to the call device and the generation device for recording the first return address and the second return address.

8. The apparatus of claim 6, wherein the call device makes the program call the function through the first API directly and makes the program call a library storing the function through the second API.

9. The apparatus of claim 6, wherein the apparatus is adapted to a Microsoft Windows system, the first API is LoadLibraryA( ) and the second API is GetProcAddress( ).

10. A method for generating a feature code to monitor a program using a processor, the processor configured to execute instructions to perform the steps of:
making the program call a function through a first application program interface (API) and a second API;
recording a first return address after the first API calls the function and recording a second return address after the second API calls the function; and
generating the feature code by using the first return address and the second return address, including shifting a plurality of bits of the second return address for a predetermined length, and applying an XOR operation to the shifting result and the first return address to derive the feature code;
wherein the feature code is used to be compared with a monitor code when the program is executed at another time to decide whether the program is attacked.

11. The method of claim 10, wherein the recording steps record the first return address and the second return address by a finite state machine.

12. The method of claim 10, further comprising the step of storing the feature code.

13. The method of claim 10, wherein the step of making the program call the function through the first API calls the function directly and the step of making the program call the function through the second API calls a library storing the function.

14. The method of claim 10, wherein the method is adapted to a Microsoft windows system, the first API is LoadLibraryA( ) and the second API is GetProcAddress( ).

15. A method for monitoring a program by a feature code using a processor, the processor configured to execute instructions to perform the steps of:
making the program call a function through a first application program interface (API) and a second API;
recording a first return address after the first API calls the function and recording a second return address after the second API calls the function;
generating a monitor code by using the first return address and the second return address, including shifting a plurality of bits of the second return address for a predetermined length, and applying an XOR operation to the shifting result and the first return address to derive the monitor code;
determining whether the monitor code is equivalent to the feature code; and generating a message showing the program being attacked when the monitor code is not equivalent to the feature code;
wherein the feature code is generated at another time the program is executed.

16. The method of claim 15, wherein the recording steps record the first return address and the second return address by a finite state machine.

17. The method of claim 15, wherein the step of making the program call the function through the first API calls the function directly and the step of making the program call the function through the second API calls a library storing the function.

18. The method of claim 15, wherein the method is adapted to a Microsoft Windows system, the first API is LoadLibraryA( ) and the second API is GetProcAddress( ).

19. A computer-readable storage medium storing a computer program to execute, using a processor, a method for generating a feature code to monitor a program, the method comprising the steps of:
making the program call a function through a first application program interface (API) and a second API;
recording a first return address after the first API calls the function and recording a second return address after the second API calls the function; and
generating the feature code by using the first return address and the second return address, including shifting a plurality of bits of the second return address for a predetermined length, and applying an XOR operation to the shifting result and the first return address to derive the feature code;
wherein the feature code is used to be compared with a monitor code when the program is executed at another time to decide whether the program is attacked.

20. The computer-readable storage medium of claim 19, wherein the recording steps record the first return address and the second return address by a finite state machine.

21. The computer-readable storage medium of claim 19, wherein the method further comprises the step of storing the feature code.

22. The computer-readable storage medium of claim 19, wherein the step of making the program call the function through the first API calls the function directly and the step of making the program call the function through the second API calls a library storing the function.

23. The computer-readable storage medium of claim 19, wherein the method is adapted to a Microsoft windows system, the first API is LoadLibraryA( ) and the second API is GetProcAddress( ).

24. A computer-readable storage medium storing a computer program to execute, using a processor, a method for monitoring a program by a feature code, the method comprising the steps of:
making the program call a function through a first application program interface (API) and a second API;
recording a first return address after the first API calls the function and recording a second return address after the second API calls the function;
generating a monitor code by using the first return address and the second return address, including shifting a plurality of bits of the second return address for a predetermined length, and applying an XOR operation to the shifting result and the first return address to derive the monitor code;
determining whether the monitor code is equivalent to the feature code; and generating a message showing the program being attacked when the monitor code is not equivalent to the feature code;

wherein the feature code is generated at another time the program is executed.

25. The computer-readable storage medium of claim 24, wherein the recording steps record the first return address and the second return address by a finite state machine.

26. The computer-readable storage medium of claim 24, wherein the step of making the program call the function through the first API calls the function directly and the step of making the program call the function through the second API calls a library storing the function.

27. The computer-readable storage medium of claim 24, wherein the method is adapted to a Microsoft Windows system, the first API is LoadLibraryA( ) and the second API is GetProcAddress( ).

* * * * *